United States Patent
Derbyshire

(10) Patent No.: US 12,296,509 B2
(45) Date of Patent: May 13, 2025

(54) MICROFLUIDIC DEVICE AND METHOD OF MANUFACTURE

(71) Applicant: HUMMINGBIRD NANO, INC., Nicholasville, KY (US)

(72) Inventor: Eleanor A. Derbyshire, Lexington, KY (US)

(73) Assignee: Hummingbird Nano, Inc., Nicholasville, KY (US)

( * ) Notice: Subject to any disclaimer, the term of this patent is extended or adjusted under 35 U.S.C. 154(b) by 526 days.

(21) Appl. No.: 17/266,668

(22) PCT Filed: Aug. 9, 2019

(86) PCT No.: PCT/US2019/045961
§ 371 (c)(1),
(2) Date: Feb. 8, 2021

(87) PCT Pub. No.: WO2020/033865
PCT Pub. Date: Feb. 13, 2020

(65) Prior Publication Data
US 2021/0299916 A1    Sep. 30, 2021

Related U.S. Application Data

(60) Provisional application No. 62/716,651, filed on Aug. 9, 2018.

(51) Int. Cl.
*B29C 39/42* (2006.01)
*B29C 35/08* (2006.01)
*B29K 69/00* (2006.01)
*B29L 31/00* (2006.01)

(52) U.S. Cl.
CPC .......... *B29C 39/42* (2013.01); *B29C 35/0805* (2013.01); *B29C 2035/0827* (2013.01); *B29K 2069/00* (2013.01); *B29L 2031/756* (2013.01)

(58) Field of Classification Search
CPC ............ B81C 1/00015; B81C 1/00031; B81C 1/00436; B81C 1/00047; B81C 1/00055; B81C 1/00063; B81C 1/00071; B81C 1/00079; B81C 1/0019; B81C 99/0005; B81C 99/0025; B81C 2201/0101; B81C 2201/0146; B81C 2201/034; B29C 39/42;
(Continued)

(56) References Cited

U.S. PATENT DOCUMENTS 4,172,916 A  * 10/1979 Watson ..................... B32B 7/04
                                                          264/440
5,948,343 A  *  9/1999 Hiroki ..................... B29C 33/76
                                                          264/319
(Continued)

FOREIGN PATENT DOCUMENTS

WO     WO 2017/102987 A1     6/2017

*Primary Examiner* — Jeffrey M Wollschlager
(74) *Attorney, Agent, or Firm* — CARRITHERS LAW OFFICE, PLLC; David W. Carrithers

(57) ABSTRACT

A method for molding a part is disclosed wherein a molding material has a minimum viscosity. A substrate that is responsive to a magnetic or electric field is introduced to the molding material. The substrate is moved by a magnetic or electric field to form channels in the molding material. The molding material is cured during or after the channels are formed.

25 Claims, 8 Drawing Sheets

(58) Field of Classification Search
CPC . B29C 2043/568; B29C 45/57; B29C 45/572; B29C 2045/577; B29C 45/1705
See application file for complete search history.

(56) References Cited

U.S. PATENT DOCUMENTS

| | | | | |
|---|---|---|---|---|
| 2003/0000835 A1* | 1/2003 | Witt | ............... | B01L 3/50273 435/288.5 |
| 2005/0009101 A1* | 1/2005 | Blackburn | ............... | B01L 7/52 435/7.1 |
| 2010/0300978 A1* | 12/2010 | Ramadan | ............... | B03C 1/0332 210/695 |
| 2011/0006464 A1* | 1/2011 | Kwon | ............... | B29C 39/22 264/496 |
| 2011/0210283 A1* | 9/2011 | Ramirez | ............... | H05K 3/3494 252/62.55 |
| 2011/0210482 A1* | 9/2011 | Sakamoto | ............... | F28F 1/16 165/185 |
| 2011/0254203 A1* | 10/2011 | Eckardt | ............... | B29C 45/1704 264/328.14 |
| 2011/0285057 A1* | 11/2011 | Ojiro | ............... | B29C 45/1704 264/328.1 |
| 2012/0068388 A1* | 3/2012 | Sakamoto | ............... | B29C 45/1704 264/573 |
| 2012/0270332 A1* | 10/2012 | Wimberger-Friedl | ............... | B03C 1/288 252/62.51 R |
| 2013/0225416 A1* | 8/2013 | Altmann | ............... | C12Q 1/6874 506/2 |
| 2013/0236591 A1* | 9/2013 | Sakamoto | ............... | B29C 45/0055 425/577 |
| 2015/0050179 A1 | 2/2015 | Hawes | | |
| 2015/0137421 A1 | 5/2015 | Jansen | | |
| 2016/0096334 A1* | 4/2016 | Sander | ............... | H01M 4/04 264/427 |
| 2017/0173893 A1* | 6/2017 | Li | ............... | H01M 4/505 |
| 2021/0187444 A1* | 6/2021 | Hemmen | ............... | B29C 67/202 |

* cited by examiner

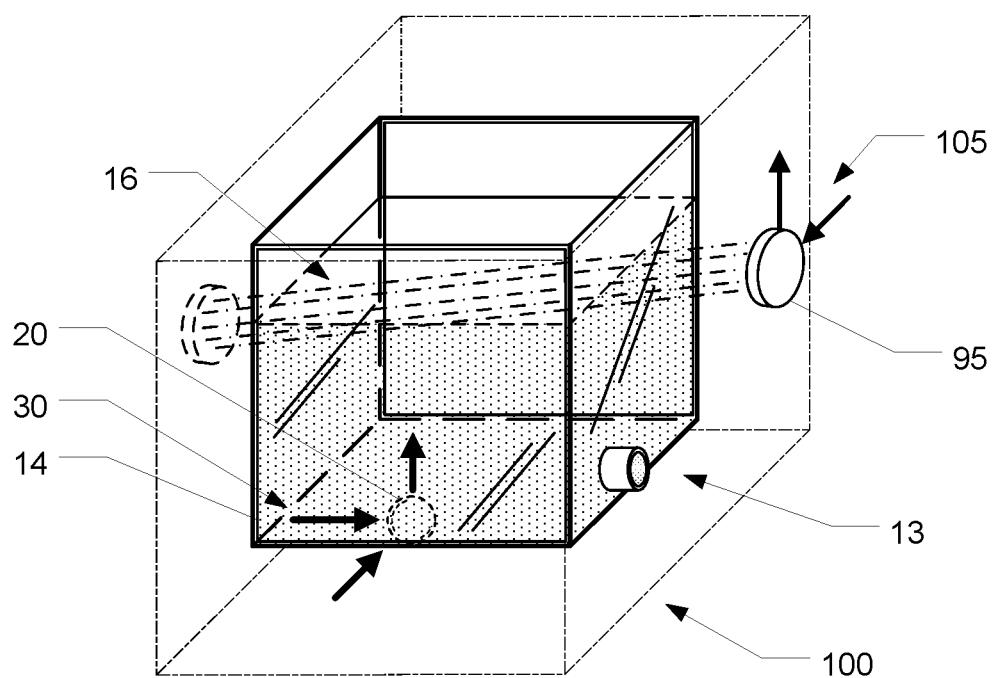
Figure 3c
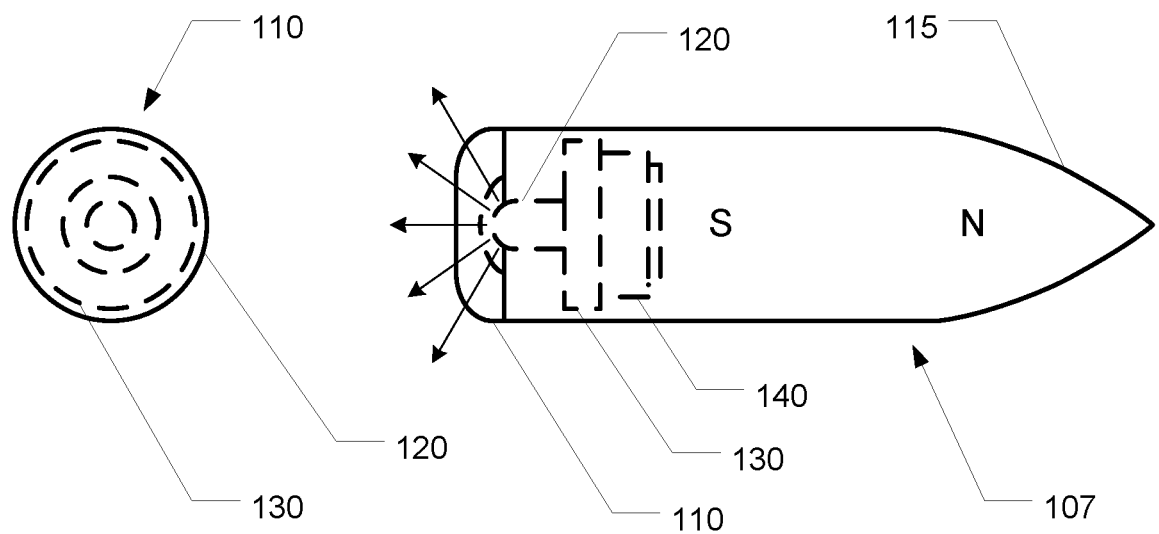
Figures 4a-b

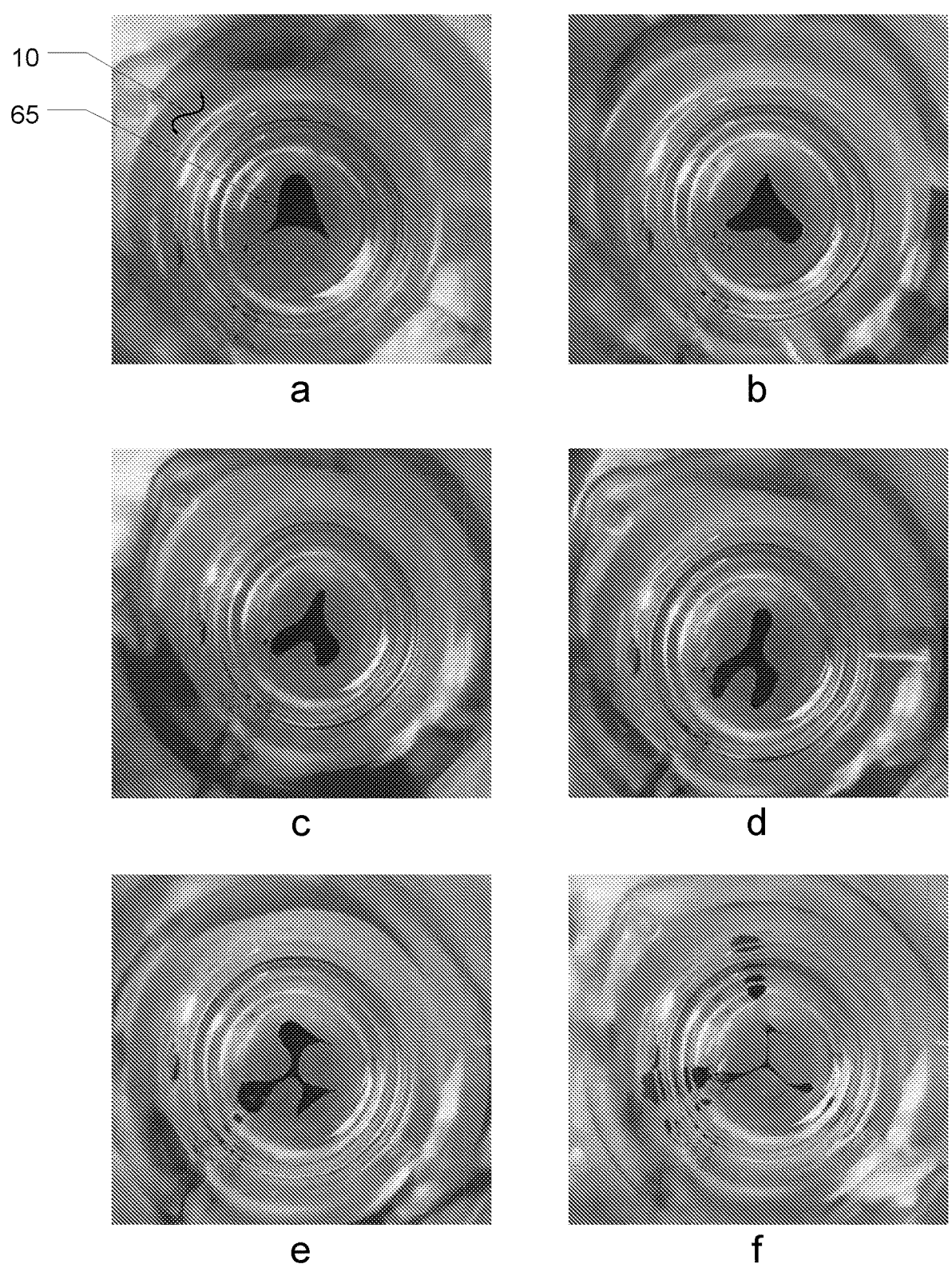
Figures 7 a-f

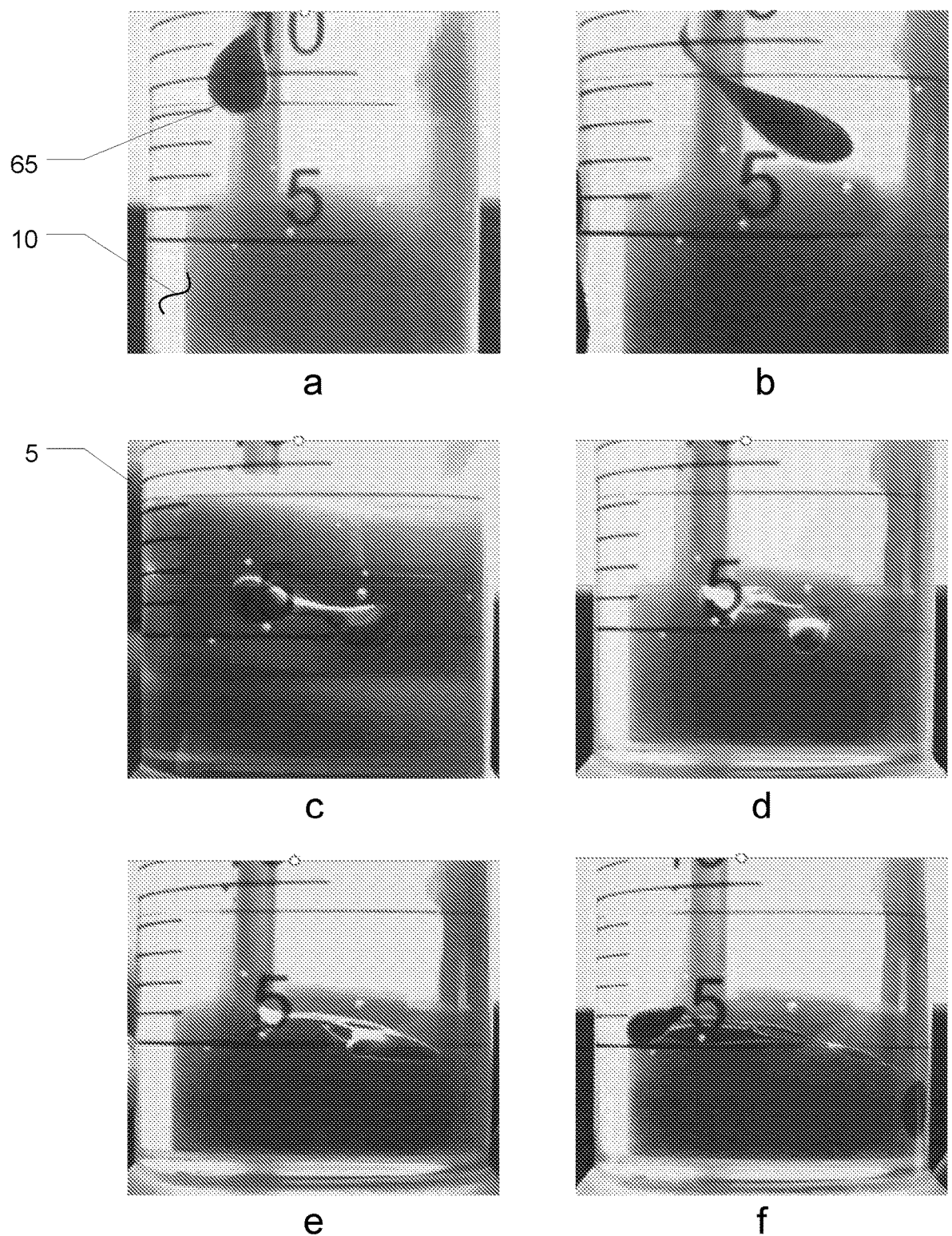
Figures 8 a-f

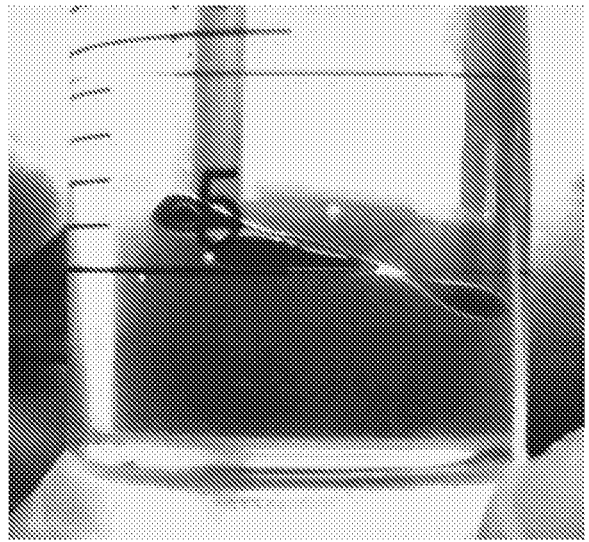
a (side view)
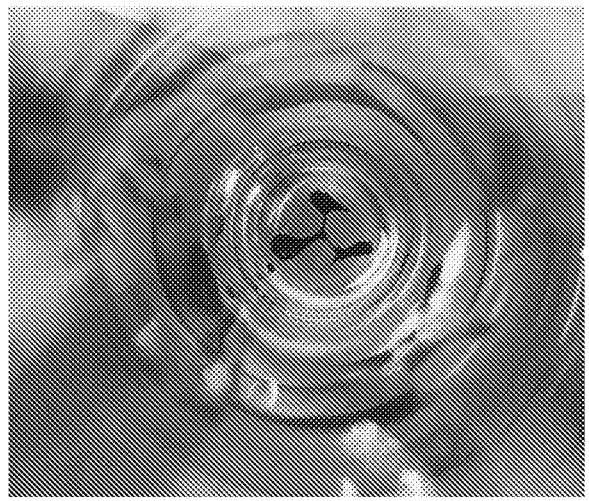
b (top view)
Figures 9 a-b

MICROFLUIDIC DEVICE AND METHOD OF MANUFACTURE

CROSS-REFERENCE TO RELATED APPLICATIONS

This application claims the benefit of U.S. Provisional Application No. 62/716,651, filed Aug. 9, 2018.

STATEMENT REGARDING FEDERALLY SPONSORED RESEARCH

This invention was made with Government support under Award #1555996 awarded by the National Science Foundation. The Government has certain rights to this invention.

BACKGROUND

Background of the Disclosure

Solid freeform fabrication of three-dimensional objects has previously been formed using extrusion methods, laser sintering, and the like. These methods typically create objects layer-by-layer, wherein a first layer is deposited, then stabilized (such as by cooling or curing), followed by subsequent layers that are deposited then stabilized. These technologies are generally mature, and have enjoyed widespread market adoption. Most recently, these technologies have been adopted by high schools and hobbyists for individual use.

Layer-by-layer fabrication methods have proven to be quite useful for many applications, although they are limited by speed, surface resolution, and material selection. These methods also suffer from limitations for forming bridging features such as holes, channels, or other internal geometries. In some cases, scaffolding features are often created from which bridging features are formed. The scaffolding is later removed from the finished part if it is accessible. If not, parts may need to be sub-divided in blocks that are later assembled into a finished part so that scaffolding can be accessed for removal one block at a time.

What is needed is a solid freeform fabrication method that is capable of rapid formation, with increased surface resolution (smoothness), and is capable of forming bridging features in a single part.

BRIEF SUMMARY OF THE DISCLOSURE

A molding method is disclosed wherein a material is provided in liquid or semi-liquid form that may be dynamically shaped by moving or distributing a responsive substrate within or along the surface of the molding material. The molding material may be enclosed in a mold that forms the outer shape of a part to be formed. A responsive substrate may be placed in the molding material for forming additional features such as internal cavities, flow channels, or hollow sections to reduce the weight of the finished part. The responsive substrate is controlled by an external force for forming these additional features. The mold may be designed to retrieve the responsive substrate, or for the responsive substrate to remain inside the finished part throughout life.

Parts formed by the methods disclosed herein are capable of being rapidly formed with a high level of surface resolution and with no scaffolding.

SUMMARY

A molding material in liquid or semi-liquid form may be dynamically shaped by moving or distributing a responsive substrate within or along the surface of the molding material. The responsive substrate may be magnetic, ferromagnetic and/or electrically responsive, and may be a rigid solid or a fluid.

The responsive substrate may be controlled by a magnetic field, an electrical field or a combination and, optionally, the magnetic field and electric field enhanced and focused using a stylus.

A magnetic force is imposed on a responsive substrate that is capable of moving the responsive substrate along or through the molding material, resulting in shape changes to the molding material.

The molding material is designed to maintain a shape formed by the responsive substrate that may be solidified after a shape has been formed, or it may be dynamically solidified while the molding material is the responsive substrate. The molding material may have a viscosity gradient or uniformly increased viscosity due to composition and/or temperature.

BRIEF DESCRIPTION OF THE DRAWINGS

FIG. 3c illustrates a perspective view of the molding system having a portion of a mold that is ferromagnetic.

FIG. 4a shows a side view of a self-curing responsive substrate having an LED emitter.

FIG. 4b shows an end view of a self-curing responsive substrate having an LED emitter.

FIGS. 7a-f show top view photographs of molding material cured with a fluidic-responsive substrate in-place.

FIGS. 8a-f show side-view photographs which correspond to FIGS. 7 a-f.

FIG. 9a shows a side view photograph of uncured molding material with a magnetically formed fluidic-responsive substrate after the magnetic field has been removed.

FIG. 9b shows a top view of the uncured molding material of FIG. 9a.

DETAILED DESCRIPTION

It is to be understood that various omissions and substitutions of equivalents are contemplated as circumstances may suggest or render expedient, but these are intended to cover the application or implementation without departing from the spirit or scope of the claims of the present invention. It is to be understood that the present invention is not limited in its application to the device and method of manufacture set forth in the following description. The present invention is capable of other embodiments. Also, it is to be understood that the phraseology and terminology used herein is for the purpose of description and should not be regarded as limiting. The use of 'including', 'comprising', or 'having' and variations thereof herein is meant to encompass the items listed thereafter and equivalents thereof as well as additional items. Further, the terms 'a' and 'an' herein do not denote a limitation of quantity, but rather denote the presence of at least one of the referenced item. It is also to be understood that the use of the terms 'channel', 'chamber' 'substrate', and associated terms known in the art should be interpreted as generally descriptive of the disclosure herein rather than as limiting.

Figure 1:
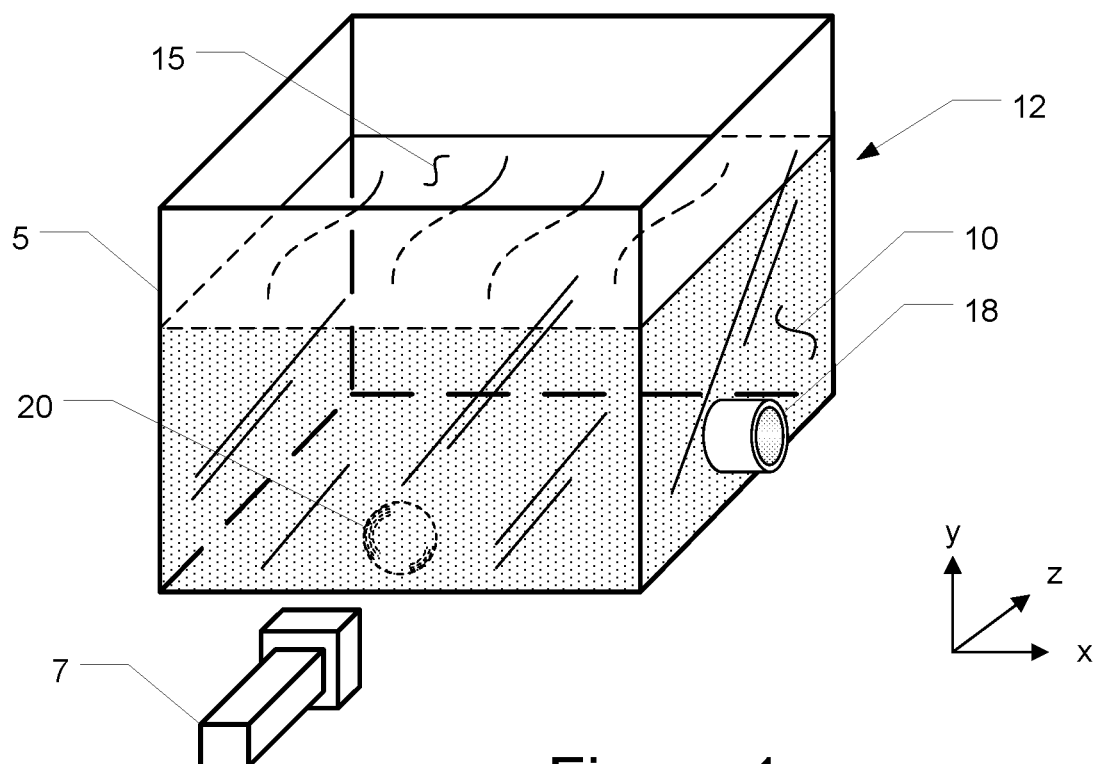
FIG. 1 illustrates a perspective view of a molding system. A stylus and responsive substrate are also shown.

FIG. 1 shows a perspective view of a molding system 12 including a mold 5, a molding material 10, a responsive substrate 20, and an access port 18. Also shown is stylus 7 that is not part of the molding system 12, but is used to control the responsive substrate 20. A three-dimensional axis is shown as well, which will be referenced subsequently.

The mold 5 is shown to be generally cubical for simplicity, although the mold 5 may be any shape such as round, oval, rectangular, curved, spherical, or any combination of these shapes. The mold 5 may also be a single surface that is flat or curved such as a bowl-shaped. The mold 5 is preferably shaped to form the final exterior shape of the part to be molded. In the Figure, the mold 5 is "open faced", which is open at the top, resulting in a free surface 15 that is the boundary between the molding material 10 and air (or other gas). An access port 18 is shown, which may be used for accessing the interior of the mold 5. Access ports 18 may be optional for an open-faced mold since the open-face provides this access over the entire top area of the mold 5. There may be one or more access ports 18 in various locations as required. The responsive substrate 20 may be positioned adjacent to the access port 18 in a rest state prior to control by the stylus 7.

The mold 5, itself, may also be ferromagnetic, and capable of responding to a magnetic field that is external to the mold 5. This is discussed further with reference to FIG. 3c.

The molding material 10 may be a viscous liquid, or may be solid pellets or powder that are sized and shaped so that a shape may be predictably retained once formed. Details of the molding material 10 will be provided further in the discussion.

The responsive substrate 20 is shown to be spherical, and in a rest state at the bottom of the mold 5. The responsive substrate 20 may be magnetically responsive, electrically responsive, or may be magnetized. The responsive substrate 20 may be rigidly formed, such as formed from steel (which is capable of being magnetically or electrically controlled) or copper (which is capable of being electrically controlled). The responsive substrate 20 may alternately be fluid-like, such as formed from Gallium-Indium and/or Gallium-Indium-Iron which is an electrically conductive fluid-metal (or ferrofluid) that is a magnetically responsive.

The position or movement of the responsive substrate 20 is capable of being controlled by a stylus 7 or other control system. In FIG. 1, the stylus 7 is mounted on a set of motion axes that are not shown, but represented by the x, y, z-axis shown in FIGS. 1 through 2c. Alternately, stylus 7 may be hand held.

The stylus 7 is used to enhance or focus the magnetic or electric fields in a region sufficiently close to the responsive substrate 20. The motion axes move the stylus 7 in a prescribed path, causing the magnetic and electrical forces to move or change along that path. The responsive substrate 20 is coupled to the stylus 7 through the magnetic or electric forces and therefore follows the path of the stylus 7, creating channels in the molding material 10. The shape of the channel (22, FIG. 2a) is controlled by the magnetic force and/or the motion of the stylus 7 resulting in the formation of arbitrary 3-D shapes such as channels 22, chambers, and other shapes.

The stylus 7 may be ferromagnetic, permanently magnetic, diamagnetic, paramagnetic or electrically conductive so as to enhance and focus or disrupt the magnetic field and electrical field. The magnetic field and/or electric field couple to the corresponding responsive substrate 20 creating forces in the x, y and z directions. The stylus 7 serves as a localized focus for the responsive substrate 20.

Figure 2A:
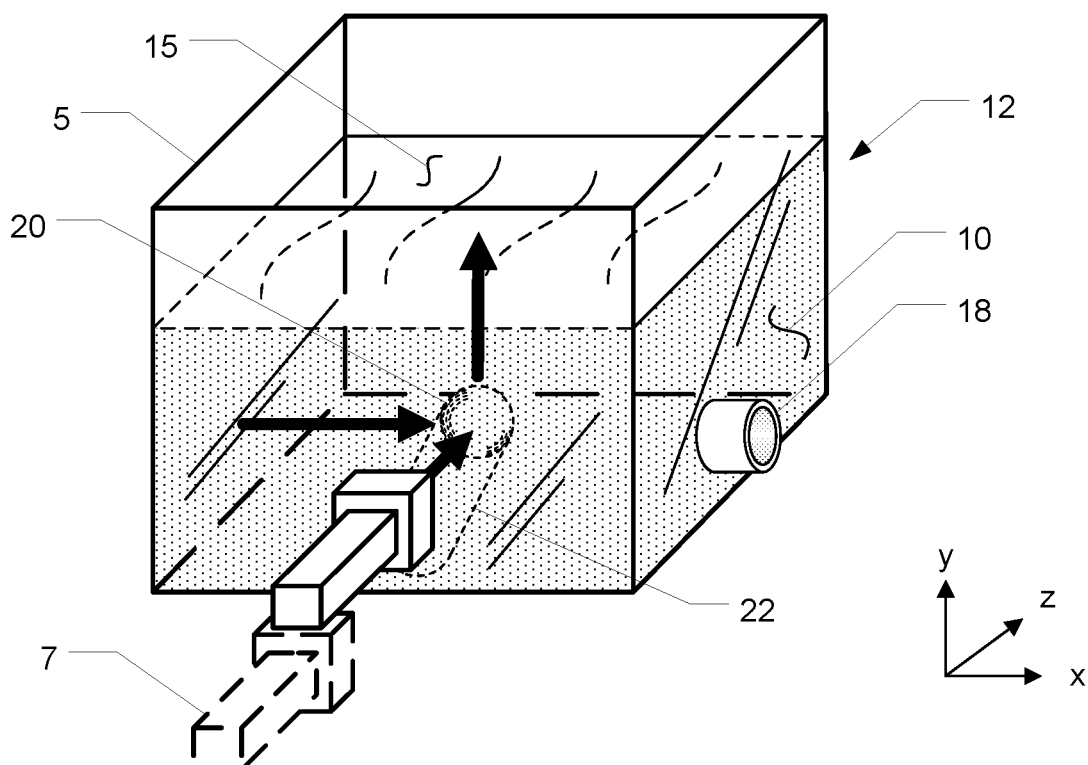
FIG. 2a illustrates the molding system of FIG. 1 in a dynamic state, wherein a straight line channel is formed.

Referring to FIG. 2a, the molding system 12 of FIG. 1 is shown in a dynamic state, wherein a magnetic force enhanced by the stylus 7 causes the responsive substrate 20 to move through the molding material 10 in a straight line motion. The magnetic force is illustrated by three force vectors—one each along the x, y, and z—axes. Each of the three force vectors may be described as "component vectors" each having a magnitude and direction. There will be a "resultant force vector" (not shown) which is the vector sum of the component vectors having a resulting magnitude and direction in a three-dimensional space.

As the stylus 7 moves (two positions are shown), the magnetic force acts to move the responsive substrate 20, resulting in a channel 22 being formed in the molding material 10. 'Channel', as used herein, refers to a cavity that is formed by a responsive substrate (such as 20) traversing axially with no substantial radial movement. The shape holding properties of the molding material 10 (such as fluid viscosity of the molding material 10 and/or the responsive substrate 20 and interfacial tension) enable the channel 22 to maintain the approximate shape formed by the responsive substrate 20. If the responsive substrate 20 is a liquid, the channel will be formed by the distribution of the liquid within the molding material 10. If the responsive substrate 20 is a solid such as pellets or powder, the channel will be formed by interlocking of pellet particles.

Figure 2B:
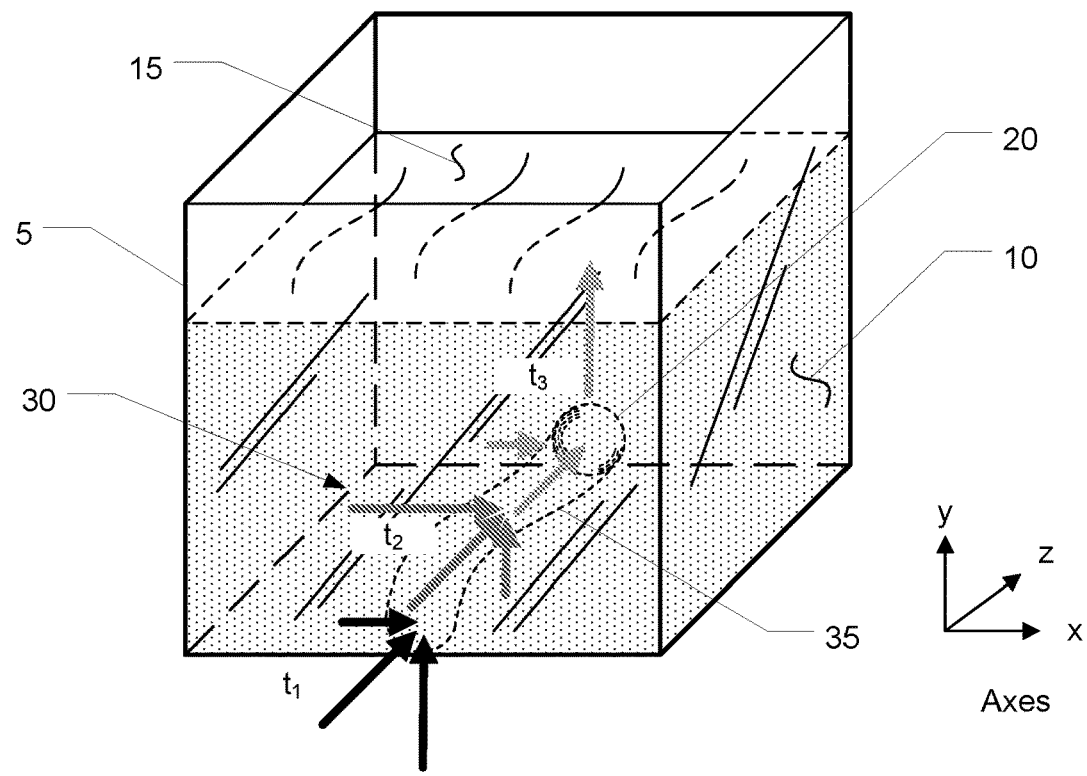
FIG. 2b illustrates the molding system of FIG. 1 in a dynamic state, wherein a curved channel is formed.

Referring now to FIG. 2b, the molding system 12 of FIG. 1 is shown in a dynamic state, wherein a magnetic force causes the responsive substrate 20 to move through the molding material 10 in a curved motion. As shown, a first magnetic field is illustrated by actuation force vectors 30 acting on the responsive substrate 20. The force vectors 30 are labeled "t(sub)1" to indicate "time 1", "t(sub)2" to indicate "time 2", and "t(sub)3" to indicate "time 3". The force vectors t(sub)1 are shown at a first position of the stylus 7 at a first time. Force vectors t(sub)2 are shown at a second position of the responsive substrate 20 at a second time. Force vectors t(sub)3 are shown at a third position of the responsive substrate 20 at a third time. The length of the force vectors 30 is shown to be different at the three times and positions, illustrating a change in the resultant force vector, thereby causing the responsive substrate 20 to traverse a first, second, and third direction in respective first, second, and third times due to varying force differentials and resulting in a desired three-dimensional channel 35 formed within the molding material 10.

Figure 2C:
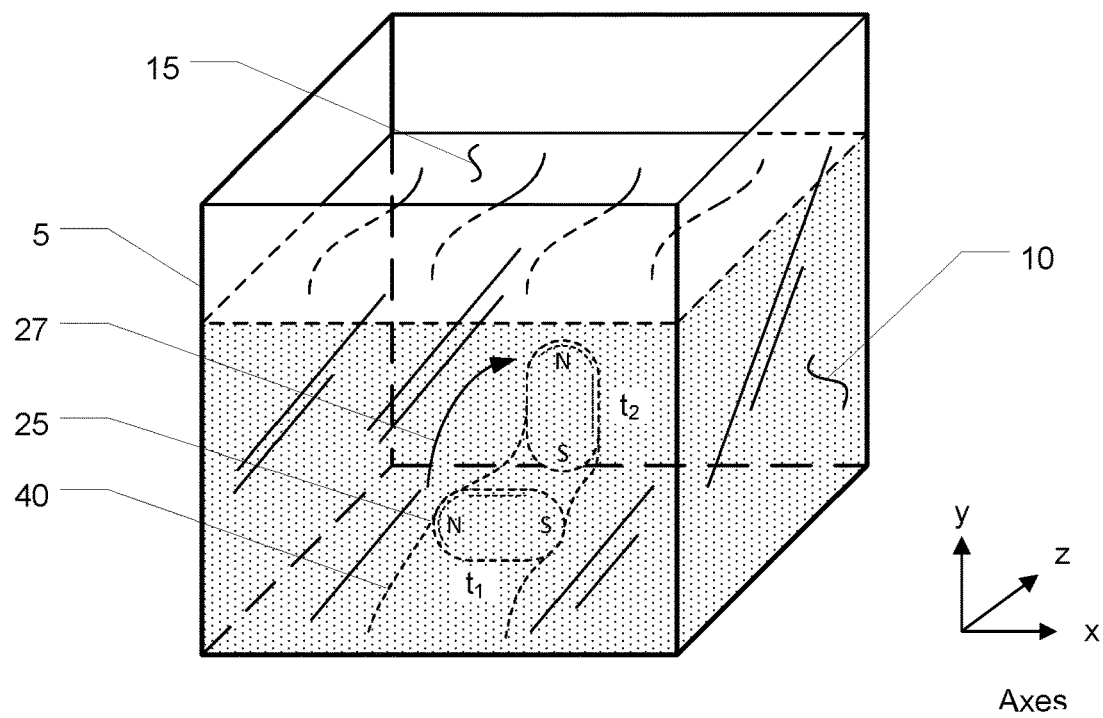
FIG. 2c illustrates a molding system having a polarized responsive substrate that is capable of forming complex channels.

It is preferable to be able to control not only movement of a responsive substrate 20 for forming a channel (or other feature), but also the angle of the responsive substrate 20 as well. Angular control enables more complex channel shapes to be formed in the molding material 10. A complex shape includes a curved shape having a single diameter, a shape having more than one diameter, or a non-circular shape. In FIG. 2c, the molding system 12 of FIG. 2b is shown but the responsive substrate 20 is replaced by a polarized responsive substrate 25. In this example, the polarized responsive substrate 25 is capsule-shaped, having a cylindrical shape with hemispherical ends (although any non-spherical shape may be used). A first end is marked with an "N", indicating a north-seeking pole (or simply north pole). A second end is marked with an "S", indicating a south pole. The polarized responsive substrate 25 improves the ability to form complex channels by use of a stylus 7 (not shown in this view) that is modified to have north and south poles that are capable of controlling the direction of the responsive substrate (such as 20), and angular rotation. In the Figure, the polarized responsive substrate 25 is shown at time t(sub)1 to be horizontal, creating a complex channel 40 wherein a cross-section has a width that is greater than the height. At time t(sub)2, a rotation of the stylus 7 (not shown) causes the polarized responsive substrate 25 to rotate about 90 degrees, as indicated by the arrow 27 shown. The cross-section of the complex channel 40 then changes so that the height is greater than the width.

The polarized responsive substrate 25 is shown to be capsule-shaped for simplicity, although additional shapes may be used such as rectangular, cylindrical, spiral, D-shaped, T-shaped, or any such shape that may benefit from polarization of two locations.

A stylus 7, such as shown in FIGS. 1 and 2a, creates a magnetic field that can be manually or electronically controlled to control the responsive substrate 20 or 25 for forming channels 22 or 40 in a molding material 10 that are generally the shape of the responsive substrate 20 or 25. However, additional manipulation of the stylus 7 can be used to create channels that are larger in cross-section than the responsive substrate 20 or 25. Large overlapping sweeps of the stylus 7 may result in large chambers (not shown) in the molding material 10. 'Chambers', as used herein, refers to a cavity that is formed by axial and radial movement of the responsive substrate (such as 20 or 25). These chambers may be formed to reduce the overall weight of the molded part, or may have some other technical benefit. By using these methods, three dimensional features of arbitrary shape can be formed.

The magnetic field created by the stylus 7 may be created passively such as by using a magnet, or actively by using an electromagnet. An active stylus 7 may have a variable strength which can compensate for greater or lesser distances from the responsive substrate 20, viscosity of the material 10, and other variables.

Figure 3A:
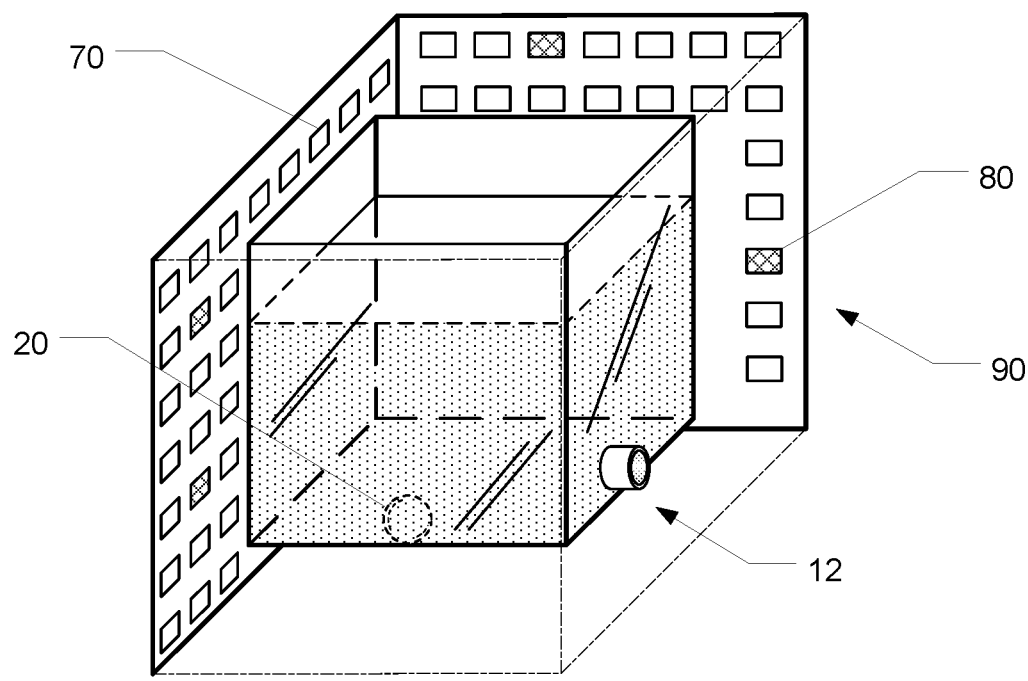
FIG. 3a illustrates a perspective view of a molding system surrounded by an electrically controlled magnetic/sensor system.

An alternative to a single stylus 7 is shown in FIG. 3a, illustrating a perspective view of the molding system 12 shown in FIGS. 1 through 2b, wherein the molding system 12 is shown surrounded by an electromagnetic/sensor system 90. The stylus 7 and motion axes are not shown. In the Figure, an array of solid state inductors 70 are shown on only two sides for clarity, although it is anticipated that up to six sides would include arrays of solid state inductors 70 if in a rectangular configuration, or otherwise fully surrounding the mold 5. The magnetic/sensor system 90 may be oval with a flat or curved top and bottom. It may be spherical or any other shape that enables efficient magnetic control of a stylus 7. These inductors 70 may be capable of independent control, or in groups as required based on the variables of the specific system. The inductors 70 generate a magnetic field when electricity passes through them. A control system (not shown) controls the timing and magnitude of the inductors 70 to produce a net magnetic field capable of causing a force differential for moving a responsive substrate 20 through the molding material 10. Solid state sensors (or simply sensors) 80 are shown to replace the position of an inductor 70 periodically within an array of inductors 70. Sensors 80 are capable of providing real time feedback to the control system so that adjustments can be made to control which inductors 70 should be energized and when to properly control the timing and direction of the responsive substrate 20. In practice, these sensors 70 will be positioned for maximum sensing feedback while minimizing any reduction in magnetic field potential. The number of sensors 80 and inductors 70 is dependent on many variables, including the shape and size of the part to be formed, the viscosity of the molding material 10, the distance or presence of the responsive substrate 20 from the magnetic field, and others. A stylus 7 may be used in cooperation with the electromagnetic/sensor system 90 to create a uniform field where the stylus 7 disrupts the field as a localized focal point. The electromagnetic/sensor system 90 may also be used to control the motion of the stylus 7 in cooperation with, or as an alternative to, the motion axes.

Figure 3B:
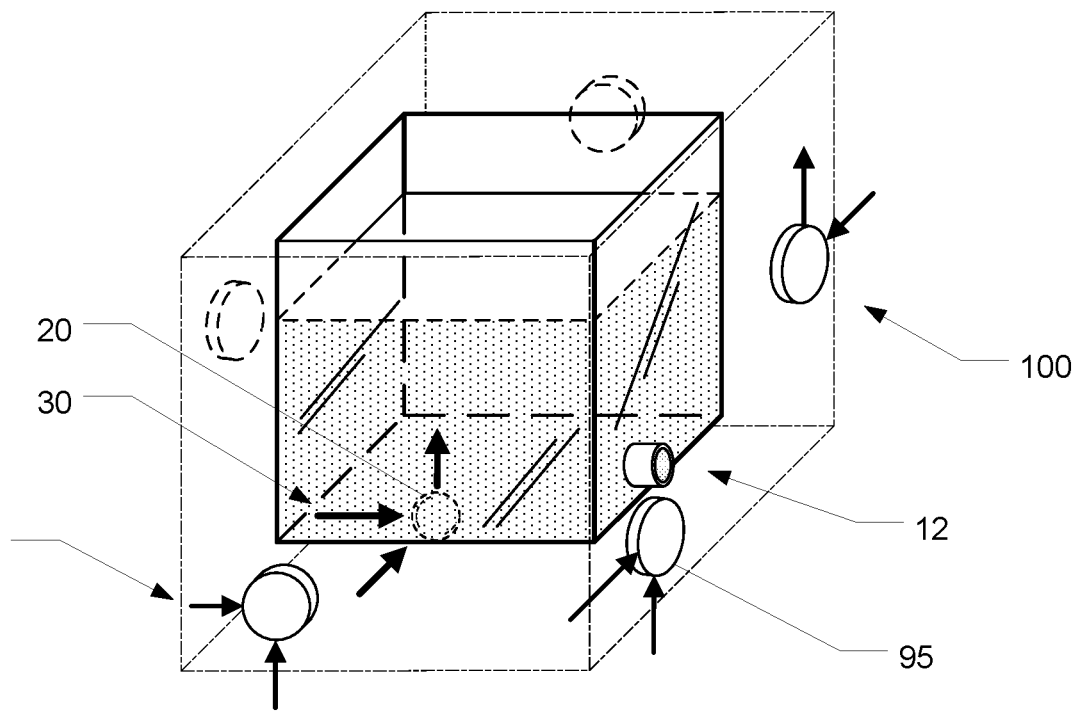
FIG. 3b illustrates a perspective view of the molding system surrounded by a discrete, permanent magnetic control system.

FIG. 3b shows an illustrated perspective view of the molding system 12 shown in FIG. 1, wherein the molding system 12 is shown surrounded by a discrete magnetic system 100. In this illustration, a number of disc-shaped magnets 95 surround the molding system 12 (although the magnets may be any shape). One or more of these magnets 95 may be controlled electronically to move in a pattern that will result in a differential magnetic force capable of controlling the movement of the responsive substrate 20 in up to three-dimensions and potentially three degrees of rotation (for a non-spherical responsive substrate such as 25).

Control forces 105 are shown acting on some of the magnets 95 shown in the Figure. The differential force (shown by actuation force vectors 30) acting on the responsive substrate 20 will determine the direction and timing of the responsive substrate 20. For a polarized responsive substrate 25, the differential force may also determine the rotation of the polarized responsive substrate 25.

Alternately, the disc-shaped magnets 95 may be replaced by ferromagnetic materials that may be moved to control the direction and timing of the responsive substrate 20.

FIG. 3c shows an illustrated perspective view of the molding system 12 shown in FIG. 1 that is modified such that two surfaces of the mold 5 are made from ferromagnetic material (such as steel), now referenced as ferromagnetic molding system 13. As shown, two end-surfaces 14 are ferromagnetic. These end-surfaces 14 are illustrated by double-lines. Discreet magnetic system 100 is shown surrounding the ferromagnetic molding system 13, with only disk-shaped magnets 95 shown for clarity. Magnetic flux lines 16 are shown flowing between the two disk-shaped magnets 95. Flux lines 16 are more concentrated due to the effect of the ferromagnetic surfaces 14. This ferromagnetic configuration can be made to create a distributed field, where the stylus 7 path creates a localized focal point/imbalance in the field to draw the responsive substrate (such as 20 or 25).

The molding material 10 will now be discussed in greater detail. The molding material 10 may be a viscous liquid, or may be solid pellets or powder that are sized and shaped so that a shape may be predictably retained once formed.

The molding material 10 may have a range of viscosities. Viscosity can be controlled by material composition, temperature, and curing. Curing may include thermal or ultraviolet methods. Increased viscosity allows a channel (22 or 40) better retain shape once the shape has been created. Additionally the forces due to interfacial energies allow for a gradient magnetic field within the molding material 10. The control of viscosity is a crucial aspect for more complex channel 40 shape retention.

The molding material 10 can be thermoplastic, thermoset, thermoform, ultra-violet (UV) curable, polydimethylsiloxane (PDMS), dipantaerythritol pentaacrylate (DPTE) or any fluid-like material that is capable of reasonably maintaining a shape formed by a moving responsive substrate 20. The molding material 10 can be viscosity controlled by temperature and/or composition to create additional forces acting within the system. As a first example, a polycarbonate may be used by first heating it to near its melt temperature, which is typically 288-316 degrees Celsius. A lower temperature may be used if combined with mechanical working, such as is common with extrusion processes. In another example, UV curable epoxies may be used, such as Cyberbond U303. This is a UV-curable compound having a working viscosity of 3,000 to 4,000 centipoise (cps) before curing. A dual-cured epoxy, which is both UV and heat-curable may also useful if molding material 10 thickness and shadow areas are not conducive to UV curing. Dual cure compounds enable UV curing for rapidly fixing a shape, followed by thermal curing to completely cure the compound.

The molding material 10 can have a range of viscosities, and may be solidified after a shape has been formed, or it may be dynamically solidified while the molding material 10 is dynamically shaped by the responsive substrate 20, the ferromagnetic mold, or both. The molding material 10 may have a viscosity gradient or uniformly increased viscosity due to composition and/or temperature. Increasing the viscosity of the molding material 10 allows for targeted impact of the magnetic field or the electric field on different parts of the responsive substrate 20. Increasing the viscosity of the molding material 10 also allows for increased stability of position and shape of the channel (22 or 40) due to a corresponding increase in interfacial tension between the molding material 10 and the magnetic and/or electrically responsive substrate 20. Channels may be formed in molding material 10 having a viscosity of 3,000 to 8,000 cps for channels (22 or 40) that are less than 1 mm in diameter, or greater than 1 mm if dynamically solidified. It is preferable that the viscosity of the molding material 10 be in the range of 10,000 to 20,000 cps, however. In this range, channels (22 or 40) up to 2 mm in diameter can be reasonably formed. Channels may be formed substantially greater than 2 mm (such as up to 4 mm) if dynamically solidified or if the viscosity of the molding material 10 is increased.

A fluidic-responsive substrate (not shown) may be used as an alternative to the responsive substrate 20 such as shown in FIG. 3b. The fluidic-responsive substrate may be a fluid-like metal such as Gallium-Indium (GaIn), wherein the fluid-like metal may take on a rigid shape. By dispensing GaIn in the presence of air, an oxide layer forms to cause a droplet to become spherical. Multiple droplets can be place adjacent one another to form, for example, a snowman shape. A positive voltage can be applied to the GaIn drops to change the shape to a thin disc. The positive voltage effectively removes the oxide layer, enabling the GaIn to be influenced by gravity, thus taking the shape of any nearby surface. A negative voltage can be applied to reform the oxide layer, causing a spherical shape. These phenomena can be used to form a fluidic-responsive substrate that is externally controlled to form channels (such as 22) in molding materials 10 similar to a rigid responsive substrate (such as 20).

Although GaIn is preferred as a fluidic-responsive substrate for many applications, alternatives may be any carrier fluid (water, ester, hydrocarbon etc) with responsive nanoparticles dispersed throughout. Fluidic-responsive substrates may also include liquid metals having ferromagnetic properties such as GaInFe which may enable use in higher temperature molding environments such as with thermoplastics.

FIGS. 4a and 4b show a self-curing responsive substrate 107 that is polarized for improved directional control. In this embodiment, a light-emitting diode (LED) emitter 120 is integrated into the self-curing responsive substrate 107, intended for use with UV curable molding materials 10. The self-curing responsive substrate 107 is shown having a round cross-section in FIG. 4a and a bullet-shaped tip 115 as shown in FIG. 4b. The self-curing responsive substrate 107 shown here includes an integrated battery 140 for powering the LED emitter 120. Alternately, battery 140 may be a connection to an external power supply (not shown). It is preferred that the wavelength of the emitted light is matched to the properties of the curing requirements of the molding material 10. For example, Cyberbond U303 requires curing at a wavelength of 300-420 nm. The LED emitter 120 would be selected to emit within this wavelength. A circuit board 130 is positioned between the battery 140 and the LED 120 for providing electrical communication to the LED 120. A lens cap 110 is fastened to the trailing portion of the polarized responsive substrate 25 wherein the lens cap 110 is preferably transparent to the wavelength of the emitted light. The lens cap 110 is preferably shaped to emit light in radial directions that will enable efficient curing of the just-formed channel through the UV curable molding material 10.

Figure 5:
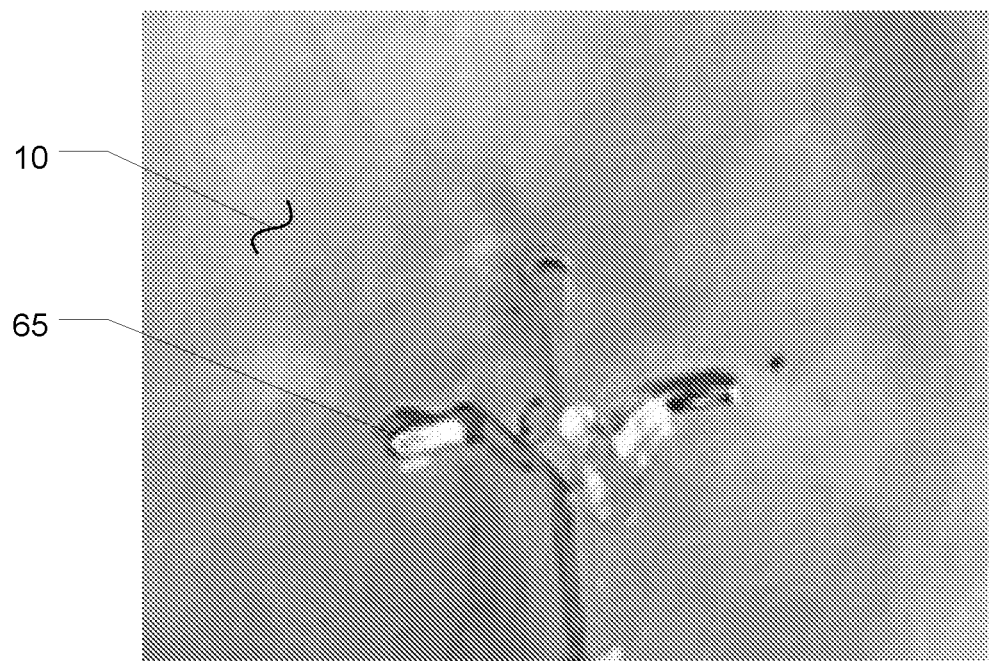
FIG. 5 shows a photograph of a first channel formed according to an embodiment of the present disclosure.
Figure 6:
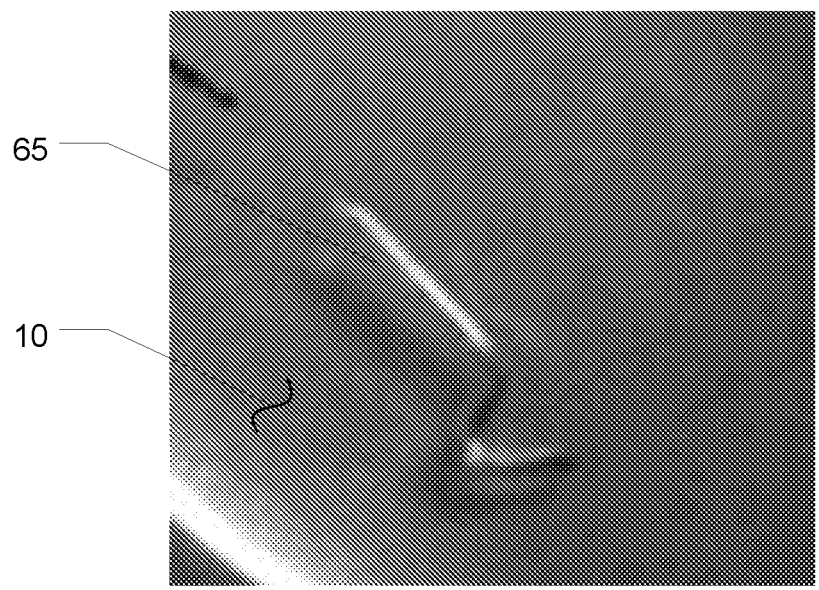
FIG. 6 shows a photograph of a second channel formed according to an embodiment of the present disclosure.

FIGS. 5 and 6 show top down photographs of shapes created using a ferromagnetic stylus 7 (not shown). The molding material 10 shown in both Figures was dipentaerythritol pentaacrylate having a working viscosity of about 13,000 cps, and was cured using a UV curing lamp. Curing occurred while the ferromagnetic stylus 7 was held stationary under the influence of a magnetic field. In FIG. 5, a T-shaped channel is shown. The stylus 7 employed was two external magnets. In FIG. 6, a hook-shaped channel, which includes a straight line segment and a C-shaped segment, is shown. The stylus (not shown) employed in FIG. 6 relied on a single external magnet to control the responsive substrate.

FIGS. 7 a-f show top view photographs of additional shapes formed by the methods of the present disclosure. The molding material 10 was DPTE having a viscosity of about 13,600 cps, which was cured using a UV curing lamp. The responsive substrate was a water based ferrofluid.

FIGS. 8 a-f show corresponding side views of the photographs shown in the views of FIG. 7. Therefore, FIG. 8a is a side view of FIG. 7a, and so on. In these photographs, the stylus (not shown) was fitted with a permanent magnetic tip and moved about the periphery of the external mold 5. The Y-shape shown in the top views (of FIG. 7) were created by abruptly changing the direction of the stylus 7 using the motion axes. This demonstrates the capability and responsiveness of the methods disclosed herein.

The stylus 7 may not only be made from a magnetically or electrically responsive material, but may also be permanently magnetized in part or in whole. Note that channels formed as shown in FIGS. 6 and 7 were formed by using a permanent magnetically tipped stylus 7.

In this instance, the responsive substrate is ferromagnetic and rigid (such as 20), although the responsive substrate may alternately be a fluidic responsive substrate.

FIG. 9a shows a side view, and 9b shows the corresponding top view, of a temperature controlled, uncured molding material 10 with a magnetically formed responsive substrate after the magnetic field has been removed, demonstrating the retention in shape of the magnetically responsive substrate due to large interfacial tension between the molding material 10 and responsive substrate which is a function of temperature and degree of curing. In addition, multiple viscosities of molding material 10 were used, ranging from 13,000-23,000 centipoise. A fluidic responsive substrate was used. The fluidic responsive substrate is more capable of responding quickly within the lower viscosity, and when the magnetic field force is greater than the viscous force. FIG. 9a-b further shows that the large viscosity and interfacial tension between the molding material 10 and the fluidic-responsive material (due to temperature control) has resulted in stable complex shapes and positions even with the external magnetic field removed.

Molding materials 10 having a range of viscosities may be achieved by introducing more than one UV curable material, in which one region of the mold 5 has a material that is more or less curable than a second UV curable material. Alternately, more than one UV light source may be used wherein one region of the mold 5 uses a UV light having a first energy, and a second region of the mold 5 uses UV light source having a second energy. Shadow areas may also be introduced to decrease the UV light energy in certain regions of the molding material 10. For heat curable molding material 10, thermal hot spots or cold spots can be introduced to the molding materials 10. Each of these methods, or combination of methods may result in a molding material 10 having a range of viscosities.

The channels (such as 22 or 35) formed by the responsive substrate may be more likely to maintain sharp transitions in complex shapes (such as the point of a star) by a combination of methods. These methods include one or more of the following:
1. Selecting high viscosity molding materials 10 that are less likely to coalesce prior to curing;
2. Use a stylus 7 that includes a UV curable LED;
3. Use UV curable LEDs outside of the mold;
4. Heat the material during and/or after forming a channel (22 or 35).

One or more methods in combination can be used for quick-curing the molding material 10. For example, the molding material 10 may be cured using an external curing system (such as heat or UV) while the responsive substrate (such as 20, 25, or 107) is still forming a channel (such as 22 or 35). For a simple channel (such as 22 or 35) formed from the bottom to the top of the mold 5, UV energy can be applied from the bottom to the top of the mold 5, lagging behind the responsive substrate a time or a distance sufficient to prevent prematurely curing the molding material 10 prior to forming the channel.

Based on the foregoing, the following example process may be employed for a magnetically responsive substrate:
1. Place viscous liquid molding material 10 into a mold 5;
2. Optionally expose the molding material 10 to a controlled temperature to achieve a desired viscosity;
3. Introduce (inject, etc) a fluid responsive substrate at a desired location in the molding material 10;
4. Expose the molding material 10 to a stylus 7, an electromagnetic/sensor system 90, or both;
5. Using the stylus 7 and/or the electromagnetic/sensor system 90, form the fluid responsive substrate to the desired shape, and optionally move the shaped fluid responsive substrate to form a channel;
6. Cure or partially cure the molding material 10, then optionally remove the fluid responsive substrate.

Because of the surface tension/viscous forces acting on the fluidic-responsive substrate, it can remain in any position (either intermediate as it is shaped or the final position) even if the magnetic system is removed entirely. This adds flexibility to the manufacturing method.

Fluidic-responsive substrates have been demonstrated to serve as a configurable mold 5, around which an immiscible or primarily immiscible molding material 10 can be molded to form a part. In addition, when a fluidic-responsive substrate is placed in the presence of a magnetic field, the fluidic-responsive substrate can serve as a focusing agent to increase the density of the magnetic field. When a subsequent fluidic-responsive substrate is within close proximity to the focused field, the fluidic-responsive substrate is attracted to the shape of that field. These focusing agents can serve as linear or nonlinear pathways around which the fluidic-responsive substrate can form.

The invention claimed is:

1. A method for molding a part, the method comprising the steps of:
   providing a mold;
   providing a UV curable molding material having a viscosity;
   providing to the molding material a self-curing responsive substrate;
   providing a stylus for creating a magnetic or electric field;
   providing a UV light source enabled to emit UV light integrated into the self-curing responsive substrate;
   moving the stylus to cause the responsive substrate to move through the molding material to form a channel;
   curing the molding material.

2. The method of claim 1, wherein the viscosity of the molding material is at least 3,000 centipoise.

3. The method of claim 1, wherein the step of moving the stylus and curing the molding material are combined.

4. The method of claim 1, wherein the self-curing responsive substrate is non-spherical and polarized.

5. The method of claim 4, wherein the channel formed by the non-spherical and polarized self-curing responsive substrate has a selected shape.

6. The method of claim 1, wherein viscosity is controlled by said molding material composition, temperature, curing, and combinations thereof.

7. The method of claim 6, wherein curing comprises a thermal method, an ultraviolet method, and combinations thereof.

8. The method of claim 1, wherein said molding material is cured during or after said channel is formed.

9. A method for molding a part, the method comprising the steps of:
   providing a mold;
   providing a UV curable molding material having a viscosity;
   providing a self-curing responsive substrate to the molding material, wherein the self-curing responsive substrate is polarized and has an internal UV light source that is enabled to emit UV light;
   providing a stylus or electromagnetic/sensor system for creating a magnetic or electric field;

controlling the stylus or electromagnetic/sensor system to cause the responsive substrate to move through the molding material to form a channel while curing;
curing the molding material.

10. The method of claim 9, wherein the viscosity of the molding material is at least 3,000 centipoise.

11. The method of claim 9, wherein the responsive substrate is non-spherical.

12. The method of claim 11, wherein the channel formed by the non-spherical and polarized responsive substrate has a selected shape.

13. The method of claim 9, wherein the channel formed by the self-curing responsive substrate has a selected shape.

14. The method of claim 9, wherein said channel comprises internal cavities, flow channels, or hollow sections.

15. The method of claim 9, including the step of controlling said responsive substrate using a magnetic field, an electrical field, or a combination electrical field and magnetic field.

16. The method of claim 15, including the step of focusing said magnetic field, said electric field, or said combination electric and magnetic field using a said stylus comprised of a magnetic or electrically responsive substrate material.

17. The method of claim 9, including the step of solidifying said responsive substrate after a selected shape has been formed.

18. The method of claim 9, wherein said responsive substrate comprises a steel material or a copper material that is electrically or magnetically responsive.

19. The method of claim 9, wherein curing comprises a thermal method, an ultraviolet method, and combinations thereof.

20. The method of claim 19, wherein said ultraviolet method includes the step of matching a wavelength of an emitted light from a light-emitting diode emitter to the curing requirement of said molding material.

21. The method of claim 20, including the step of using a first UV curable molding material together with at least a second UV curable molding material each one having a different range of viscosities curable by said emitted light from said light-emitting diode at a different energy level.

22. The method of claim 9, including the step of forming channels less than 1 mm in diameter in said molding material having a viscosity in a range of from 3,000 to 8,000 cps.

23. The method of claim 9, including the step of forming channels less than 2 mm in diameter in said molding material having a viscosity in a range of from 10,000 to 20,000 cps.

24. The method of claim 9, including the step of increasing the viscosity of the molding material allows for targeted impact of the magnetic field or the electric field on different parts of the said responsive substrate.

25. The method of claim 16, including the step of increasing the viscosity of said molding material allowing for an increased stability of position and shape of a channel due to a corresponding increase in interfacial tension between said molding material and said magnetic and/or electrically responsive substrate.

* * * * *